US008918412B1

(12) United States Patent
Jesurum

(10) Patent No.: US 8,918,412 B1
(45) Date of Patent: Dec. 23, 2014

(54) QUERY PROXY SYSTEM FOR CLIENT-SPECIFIED MODELS

(75) Inventor: Caroline Esther Jesurum, Needham, MA (US)

(73) Assignee: Progress Software Corporation, Bedford, MA (US)

( * ) Notice: Subject to any disclaimer, the term of this patent is extended or adjusted under 35 U.S.C. 154(b) by 1395 days.

(21) Appl. No.: 12/270,571

(22) Filed: Nov. 13, 2008

Related U.S. Application Data

(60) Provisional application No. 60/988,309, filed on Nov. 15, 2007.

(51) Int. Cl.
*G06F 7/00* (2006.01)
*G06F 17/30* (2006.01)

(52) U.S. Cl.
USPC ......................................................... 707/760

(58) Field of Classification Search
USPC ......................................................... 707/760
See application file for complete search history.

(56) References Cited

U.S. PATENT DOCUMENTS

| | | | |
|---|---|---|---|
| 6,195,662 B1 * | 2/2001 | Ellis et al. ............................... | 1/1 |
| 2002/0049642 A1 * | 4/2002 | Moderegger et al. ............ | 705/26 |
| 2003/0093402 A1 * | 5/2003 | Upton ................................ | 707/1 |
| 2003/0105884 A1 * | 6/2003 | Upton ............................ | 709/318 |
| 2005/0096124 A1 * | 5/2005 | Stronach ........................ | 463/25 |
| 2005/0149537 A1 * | 7/2005 | Balin et al. .................... | 707/100 |
| 2008/0155400 A1 * | 6/2008 | Christensen ................... | 715/273 |
| 2009/0088875 A1 * | 4/2009 | Baier et al. ....................... | 700/83 |
| 2009/0313644 A1 * | 12/2009 | Klets et al. .................... | 719/328 |

OTHER PUBLICATIONS

Bernstein et al., "Data Warehouse Scenario for Model Management", 2000, Microsoft Corporation.*
Rahm et al., "A Survey of Approaches to Automatic Schema Matching", 2001, Microsoft Research.*

* cited by examiner

*Primary Examiner* — Rehana Perveen
*Assistant Examiner* — Huen Wong
(74) *Attorney, Agent, or Firm* — Patent Law Works LLP

(57) ABSTRACT

A system for translating a query expression for a client-specified model (CSM) to a plurality of query expressions compatible with the object model(s) for a plurality of source systems. The source systems comprise a plurality of databases. The databases comprise source information and X sets of response data. The source information comprises mapping metadata and object model metadata. The X sets of response data is data response to a client query. The client comprises client-specified mapping metadata, a CSM, and a query proxy. The query proxy comprises an import module, a client interface module, and a translator module. The import module imports the source information from the plurality of source systems and determines the mapping metadata and the object model metadata. The client interface module receives the CSM, the client-specified mapping metadata, and a query from a client. The translator module parses the query expression and translates a plurality of query expressions compatible with the object model(s) for the plurality of source systems.

19 Claims, 13 Drawing Sheets

QUERY PROXY SYSTEM FOR CLIENT-SPECIFIED MODELS

CROSS REFERENCE TO RELATED APPLICATIONS

This application also claims priority under 35 U.S.C. §119 (e) from U.S. Provisional Patent Application No. 60/988,309, titled "A Method And System For Query Translation Utilizing Mapping MetaData," filed Nov. 15, 2007, which is incorporated by reference herein in its entirety.

BACKGROUND OF THE INVENTION

1. Field of the Invention

The present invention relates to the field of model driven design in general, and specifically, to the field of data integration using client-specified model.

2. Description of the Background Art

In recent years, the volume of data stored in databases has increased dramatically, along with the need to share existing data under a single query interface. One solution to these problems is data integration. Data integration is the process of providing a client with a unified way of accessing data residing on multiple source systems. However, prior art approaches of data integration have numerous problems that remain unresolved.

One prior art approach of data integration is data warehousing. Data warehousing involves Extracting data from different databases, Translating the heterogeneous data to a uniform schema, and then Loading the data into a single warehouse repository (i.e., "the ETL process"). The data from the different databases can then be accessed by a client using a single or unified query interface. However, this prior art approach is time consuming and computationally expensive.

The data warehousing approach has numerous additional problems. One problem is that the different data architectures are tightly coupled because the data resides in a single repository at query time. As a result, it is difficult to maintain the "freshness" of the data stored in the warehouse without performing multiple ETL processes. For example, assume that data from databases A, B and C are processed and stored in Warehouse Z. Now assume that databases A, B and C are updated with new data. Because the architecture of the data warehousing model is tightly coupled, this update will not be realized at Warehouse Z unless a new ETL process in initiated. Another problem with the data warehousing approach is that the warehouse repository can be difficult to construct in web environments because the designer frequently only has access to a query interface instead of all the information on the databases. Yet another problem with the data warehousing approach is these systems do not allow the client to specify a data model for the data stored in the warehouse.

SUMMARY OF THE INVENTION

The present invention overcomes the deficiencies and limitations of the prior art by providing a query proxy system and method for retrieval using a plurality of query expressions for a plurality of source systems generated from a query expression for a client-specified model.

In one embodiment, a computing system includes a client having a query proxy system communicatively coupled to a source system. In particular, the query proxy system comprises an import module, a client interface module and a translator module. The client also comprises a Client-Specified Model ("CSM") and client-specified mapping metadata in addition to the query proxy system. The client is communicatively coupled either directly or indirectly to a plurality of source systems. Each source system comprises one or more database(s) having source information. The source information includes mapping metadata, object model metadata and response data for responding to client queries. The query proxy system imports source information from the database(s); determines which mapping metadata and object model metadata correspond to which source systems; receives a CSM, mapping metadata and a query expression for the CSM from the client; parses the query expression for the CSM; and translates the parsed query expression into a plurality of query expressions, each of the plurality of query expressions being compatible with the object model for one of the plurality of source systems.

The present invention also includes methods for translating or generating a plurality of query expressions for a plurality of source systems.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
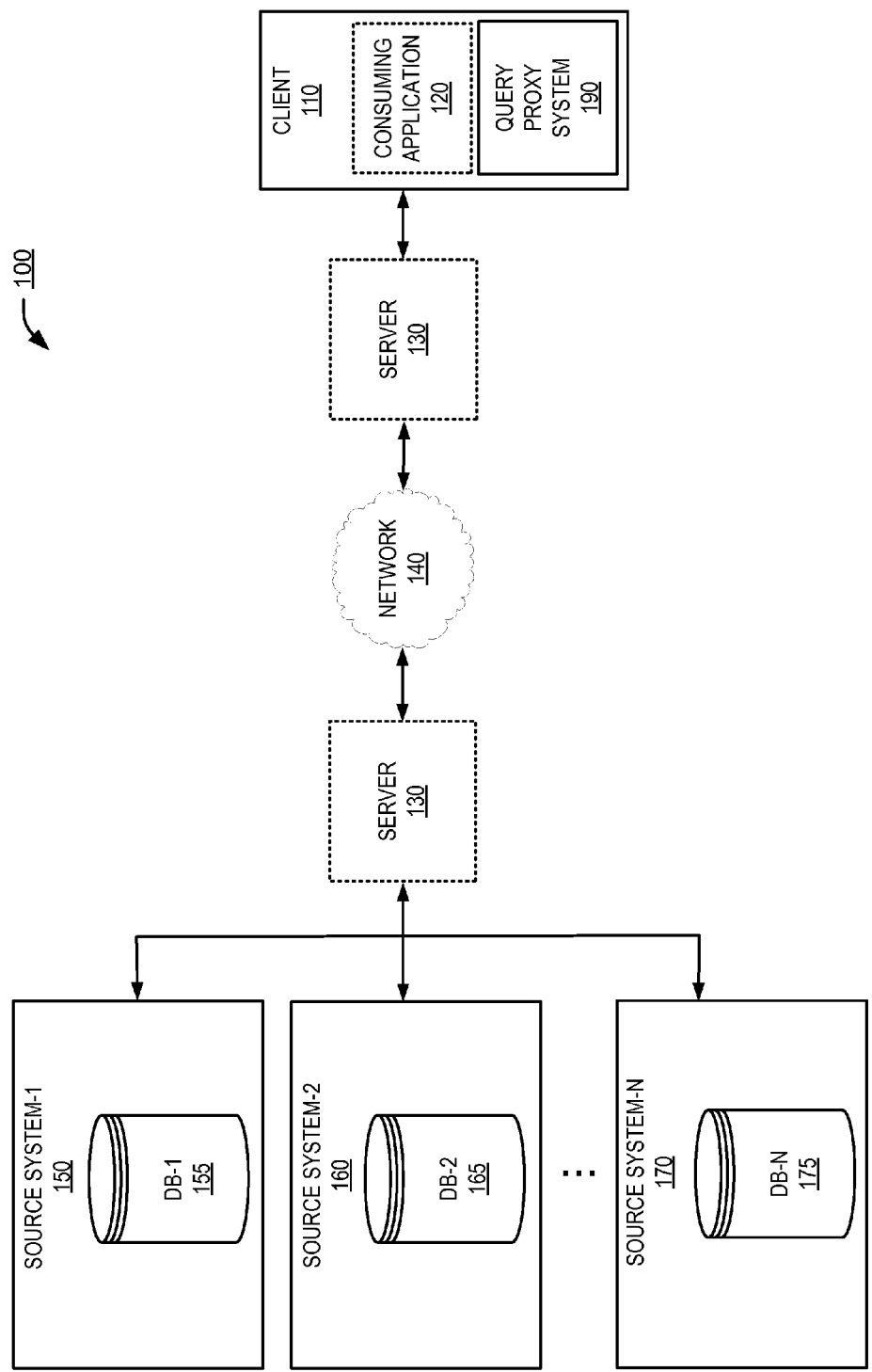
FIG. 1 is a block diagram of an example computing system including one embodiment of the present invention.

A query proxy system and method for translating a query expression for a Client-Specified Model ("CSM") to a plurality of query expressions for a plurality of source systems is described.

Reference in the specification to "one embodiment" or "an embodiment" means that a particular feature, structure or characteristic described in connection with the embodiment is included in an embodiment of the invention. The appearances of the phrase "in one embodiment" in various places in the specification are not necessarily all referring to the same embodiment.

As used herein, the terms "comprises," "comprising," "includes," "including," "has," "having" or any other variations thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a tangible computer readable storage medium, such as, but not limited to, any type of disk including floppy disks, optical disks, CD-ROMs and magnetic optical disks, solid-state storage devices, read-only memories (ROMs), random access memories (RAMs), EPROMs, EEPROMs, magnetic or optical cards, or any type of media suitable for storing electronic instructions, each coupled to a computer system bus.

The present invention also relates to the persistent storage of data in a database or data storage devices. The data storage device may be any suitable non-volatile mass storage device capable of persistently storing data such as but not limited to hard disk drives, solid-state storage devices, optical storage devices, a flash memory devices, magnetic storage devices, etc.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not limited to any particular programming language, application programming interface (API), driver type, and/or specification. It will be appreciated that a variety of programming languages, APIs, driver types, and/or specifications may be used to implement the teachings of the invention as described herein.

System Overview

Figure 2:
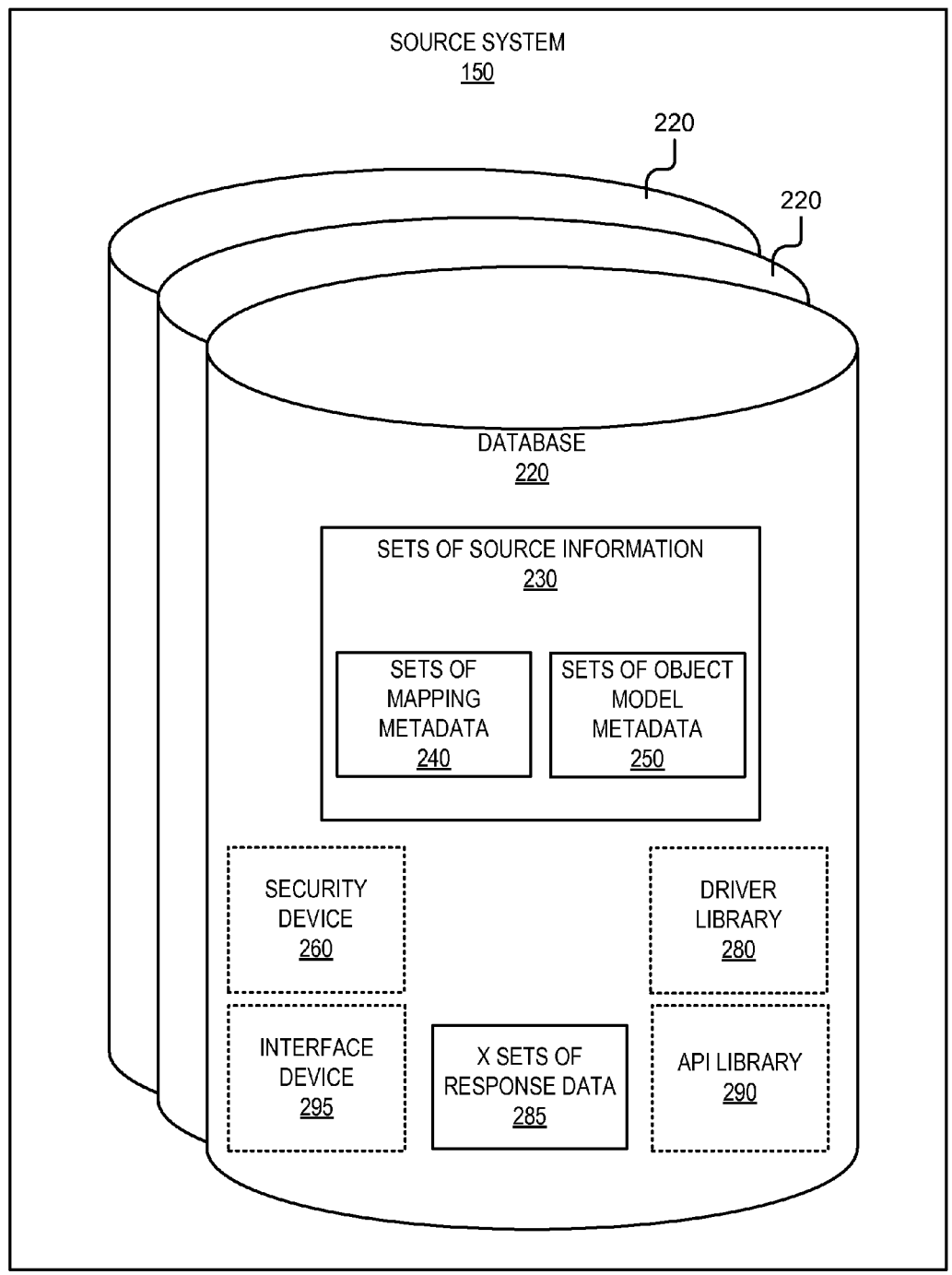
FIG. 2 is a block diagram of an embodiment of a source system.

FIG. 1 illustrates a block diagram of a computing system 100 for the present invention comprising a client 110 and a plurality of source systems 150, 160 and 170. The client 110 is communicatively coupled (directly or indirectly) to the source systems 150, 160 and 170 in a conventional manner. Although a plurality of source systems 150, 160 and 170 are shown in FIG. 1, there need only be one. Each source system 150, 160 and 170 comprises at least one database 155, 165 and 175 and other features that will be described below and that are illustrated in FIG. 2. In some embodiments, each source system 150, 160 and 170 comprises a plurality of databases.

The client 110 comprises a query proxy system 190 and optionally a consuming application 120. The client 110 is also communicatively coupled to the source systems 150, 160 and 170 via one or more networks 140 and/or one or more servers 130. The client 110 and its components are described in more detail below with reference to FIG. 3.

The network 140 comprises any combination of conventional networks such as a local area network (LAN), a wide area network (WAN), the Internet, an intranet (including, but not limited to, an intranet in an enterprise computing environment), an extranet or other suitable communication system wired or wireless. The network 140 can be secure or unsecure. The network 140 communicatively couples the client 110 to the source systems 150, 160 and 170. The servers 130 comprises any combination of conventional server types (e.g., database servers, web servers, and/or application servers) and provides any combination of conventional features (e.g., database management systems, tangible computer-readable storage devices, model libraries, driver libraries, API libraries, interface devices, security devices, input peripherals, and/or output peripherals).

The query proxy system 190 imports source information from each database 155, 165 and 175 on each source system 150, 160 and 170. The data models for the source systems 150, 160 and 170 are relational, object-oriented or a data model adapted for web-services (e.g., XML, etc.). The query proxy system 190 is configured to retrieve data from the source systems 150, 160 and 170 and transform the data based on a client-side schema. The client-side schema is defined by the CSM and client-specified mapping metadata (See FIG. 3). Thus, the query proxy system 190 gives the client 110 total control of how data is translated between the source systems 150, 160 and 170 and the client 110. This translation requires no custom programming, and is completely automated once the data models for each of the source systems 150, 160 and 170 are initially determined.

In some embodiments the CSM and the client-specified mapping metadata are specified by a human user of the client 110 via a graphical user interface.

Source Systems

FIG. 2 illustrates a block diagram of an embodiment of a source system 150. Source system 150 is depicted in FIG. 2 only by way of example. In practice, source systems 160 and 170 include more or less components and functionality than depicted in FIG. 2 and described below for source system 150.

In one embodiment, the source system 150 comprises a plurality of databases 220 as shown in FIG. 2. For example, the plurality of databases 220 is a plurality of databases similar to database 155. While the description below will focus on a single database 220, those skilled in the art will recognize that the other databases in the plurality of databases 220 include the same or similar functionality and components. Each database 220 further comprises a plurality of sets of source information 230. Each set of source information 230 comprises a set of mapping metadata 240 and a set of object model metadata 250. The database 220 further comprises X sets of response data 285 (where X equals any nonnegative integer, including zero). The X sets of response data 285 comprises information responsive to queries received from the client 110.

The plurality of databases 220 are conventional, tangible databases that store sets (structured collections) of source information 230. The sets of source information 230 comprise any combination of conventional relational, object-oriented or XML computer code stored on a plurality of tangible computer-readable storage mediums (e.g., databases 155, 165 and/or 175). The mapping metadata 240 comprises data describing relationships between the logical model and physical model, for example a mapping between a logical schema and physical schema such as in JDBC or SQL. The object model metadata 250 comprises any combination of conventional object models such as any relational, object, object-relational, hierarchical and/or network models. In one embodiment, the X sets of response data 285 are stored across the plurality of databases 220, a tangible computer-readable storage medium, and comprise data stored in heterogeneous or homogeneous data systems.

Optionally, the databases 220 also comprise (or are communicatively coupled to) a security device 260 to prevent unintended access to data and/or any combination of other conventional features that facilitate query processing such as a driver library 280 (comprising, e.g., ODBC drivers, JDBC drivers, ODBC-JDBC bridges, JDBC-ODBC bridges, etc.), an API library 290 (comprising, e.g., ODBC APIs, JDBC APIs, etc.), and/or an interface device 295.

Client

Figure 3:
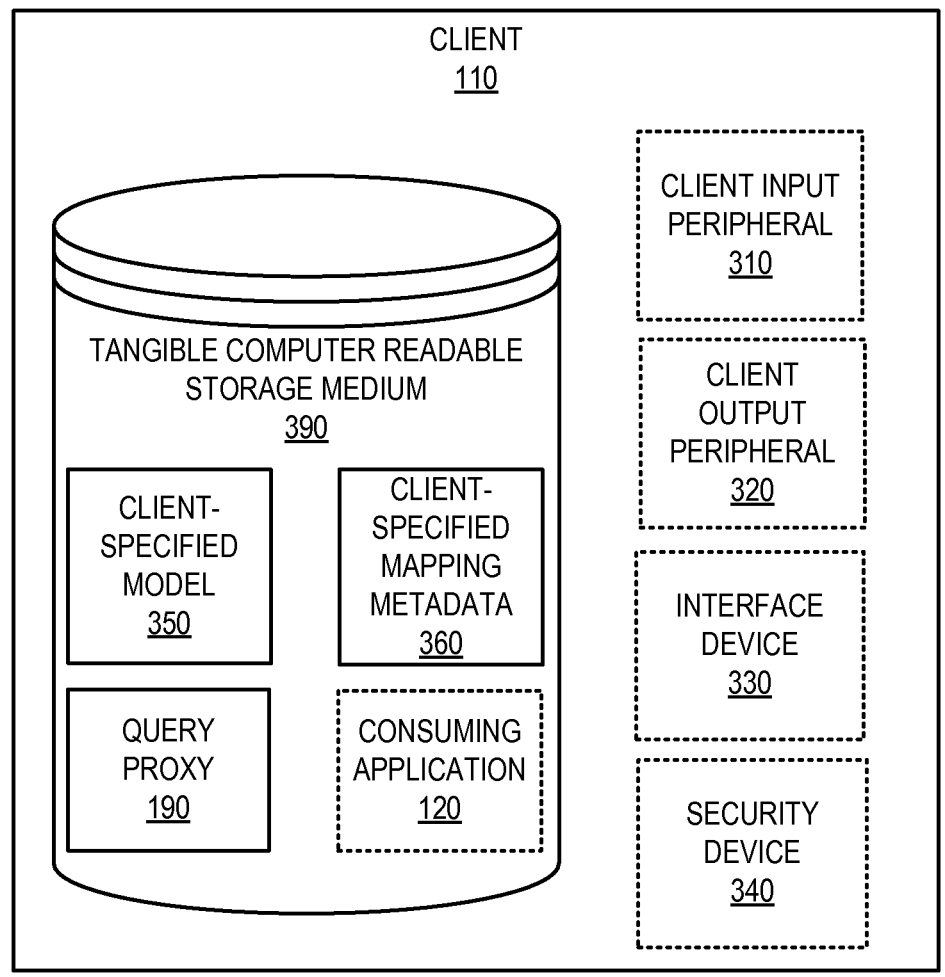
FIG. 3 is a block diagram of an embodiment of a client.

FIG. 3 is a block diagram of an embodiment of a client 110. The client 110 comprises a tangible computer-readable storage medium 390 including a CSM 350, client-specified mapping metadata 360 and the query proxy system 190.

The storage medium 390 comprises a hard disk, flash memory or any similar computer-readable storage device.

The CSM 350 comprises any conventional object model specified by the client 110 (or a human user of the client 110). An object model is a description of the structural relationships among components of a database. For example, the CSM 350 comprises any object model imported from the Unified/Universal Modeling Language (UML), any conventional object models based in whole or in part on the Open Applications Group Specification (OAGIS), or a customized object model unique to a specific enterprising environment (e.g., an object model custom engineered for a particular enterprise computing environment).

The client-specified mapping metadata 360 is information that describes the relationship among classes of data stored on the client-side. For example, the client-specified mapping metadata 360 can describe the structure of data stored on one or more a client-side databases (not pictured) in contrast to the databases 155, 165, 175 and 220 on the source side.

At a modeling stage, the query proxy system 190 imports a plurality of sets of source information 230 from a plurality of source systems 150, 160 and 170. The query proxy system 190 determines sets of mapping metadata 240 (e.g., one set per source system 150, 160 and 170) and sets of object model metadata 250 (e.g., again, one set per source system 150, 160 and 170) based on the sets of source information 230. Once determined, the sets of mapping metadata 240 and sets of object model metadata 250 are stored on any client-side storage device (e.g., storage medium 390) for later use and reuse. The query proxy system 190 receives a CSM 350, client-specified mapping metadata 360, and a query from the client 110, each of which can be specified by a human user of the client 110 via a graphical user interface. In preferred embodiments, the query is expressed in a query language expressed in any context-free grammar (e.g., Backus-Naur Form, etc.) that is sufficiently general enough to express abstract queries including complex predicates over each of the source system object models.

At runtime, the query proxy system 190 transforms the query received from the client 110 into a plurality of queries compatible with the object models for the plurality of source systems 150, 160 and 170, executes the plurality of queries against the source systems 150, 160 and 170, and receives results from the source systems 150, 160 and 170 responsive to execution of the queries. Using the same client-specified mapping metadata 360, these results are transformed into instances of the CSM 350 and are a subset of the X sets of response data 285 stored across the plurality of databases 220. The query proxy system 190 is described in more detail below with reference to FIG. 4.

Optionally, the client 110 can also comprise (or be communicatively coupled to) any combination of client input peripherals 410, client output peripherals 420, an interface device 430, a security device 440, and/or a consuming application 120.

Query Proxy

Figure 4:
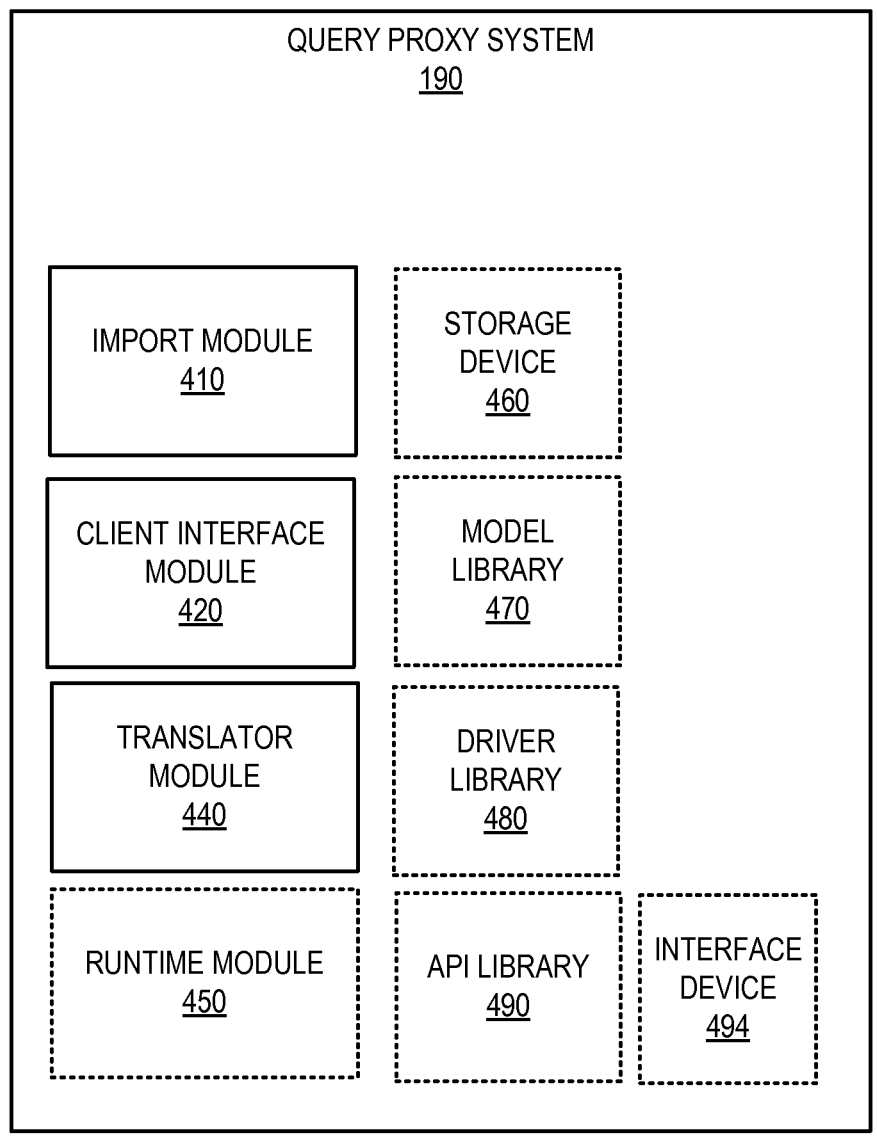
FIG. 4 is a block diagram of an embodiment of a query proxy system.

Referring now to FIG. 4, one embodiment of the query proxy system 190 is described. The query proxy system 190 comprises an import module 410, a client interface module 420 and a translator module 440. In some embodiments, the query proxy system 190 further comprises a runtime module 450. In some embodiments, modules 410, 420, 440, and 450 comprise computer-readable computer code stored on a tangible computer-readable storage medium (e.g., storage medium 390). The query proxy system 190 is communicatively coupled (directly or indirectly) to a plurality of source systems 150, 160 and 170 in a conventional manner.

The import module 410 is adapted to communicate with the source systems 150, 160 and 170. The import module 410 imports the mapping metadata 240 and the object model metadata 250 using any combination of importation methods, including parsing metadata from one or more XML databases, querying tables in one or more databases, importing APIs from one or more databases (including, e.g., Java API importer), data reflection/introspection across one or more databases, SQL metadata querying across one or more databases, or parsing header files from one or more databases. The import module 410 stores the mapping metadata 240 and the object model metadata 250 on a storage device (e.g., storage medium 390) for later use by the client interface module 420 and the translator module 440. While the import module 410 is shown as being a separate module of the query proxy system 190 in FIG. 4 from the client interface module 420, those skilled the art will recognize that in another embodiment, the import module 410 is part of the client interface module 420. Further those skilled in the are will also recognize that in other embodiments, the mapping metadata 240 is inherently part of the import module 410 and need not be imported.

Figure 11:
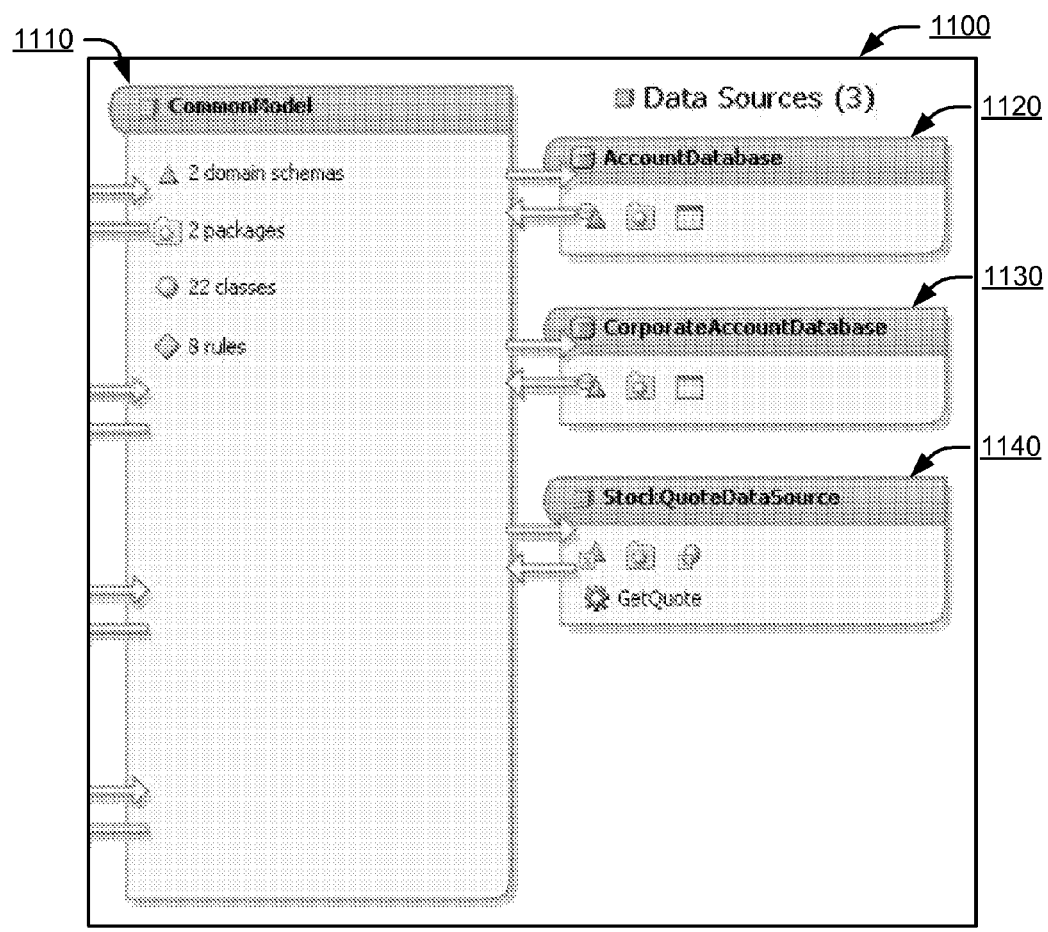
FIG. 11 is a graphical representation of a first embodiment of a user-interface for accessing the query proxy system of the present invention.
Figure 12:
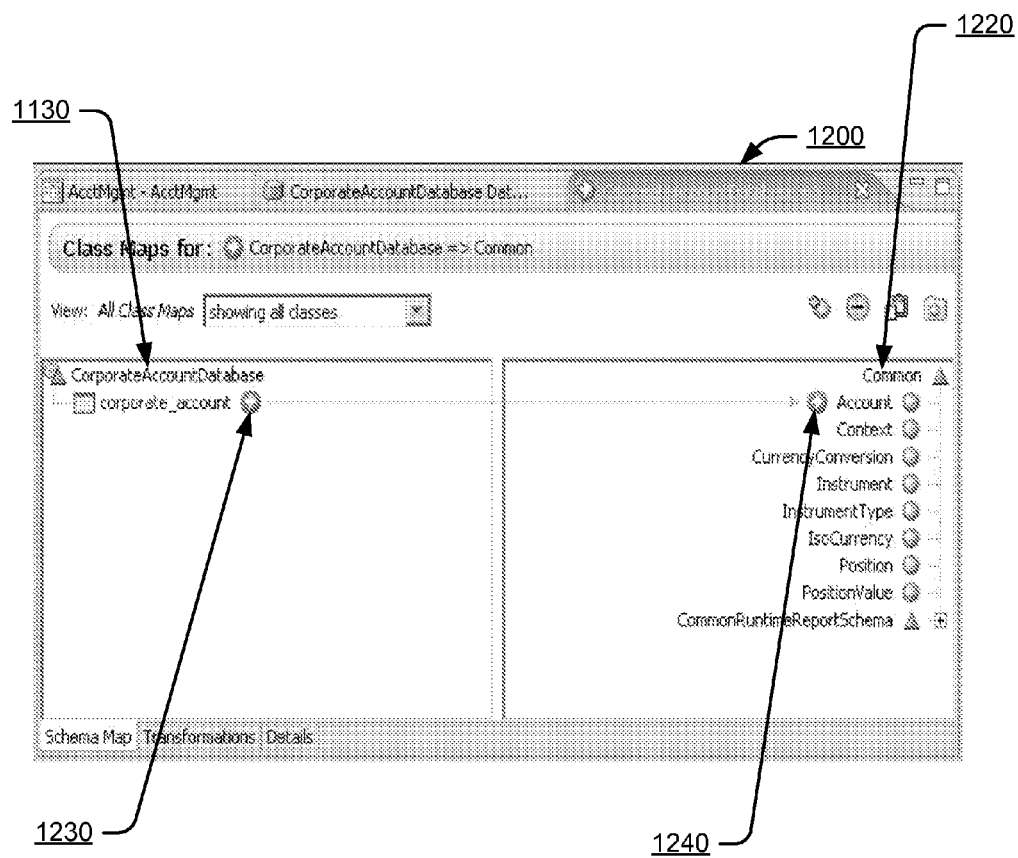
FIG. 12 is a graphical representation of a second embodiment of a user-interface for accessing the query proxy system of the present invention.
Figure 13:
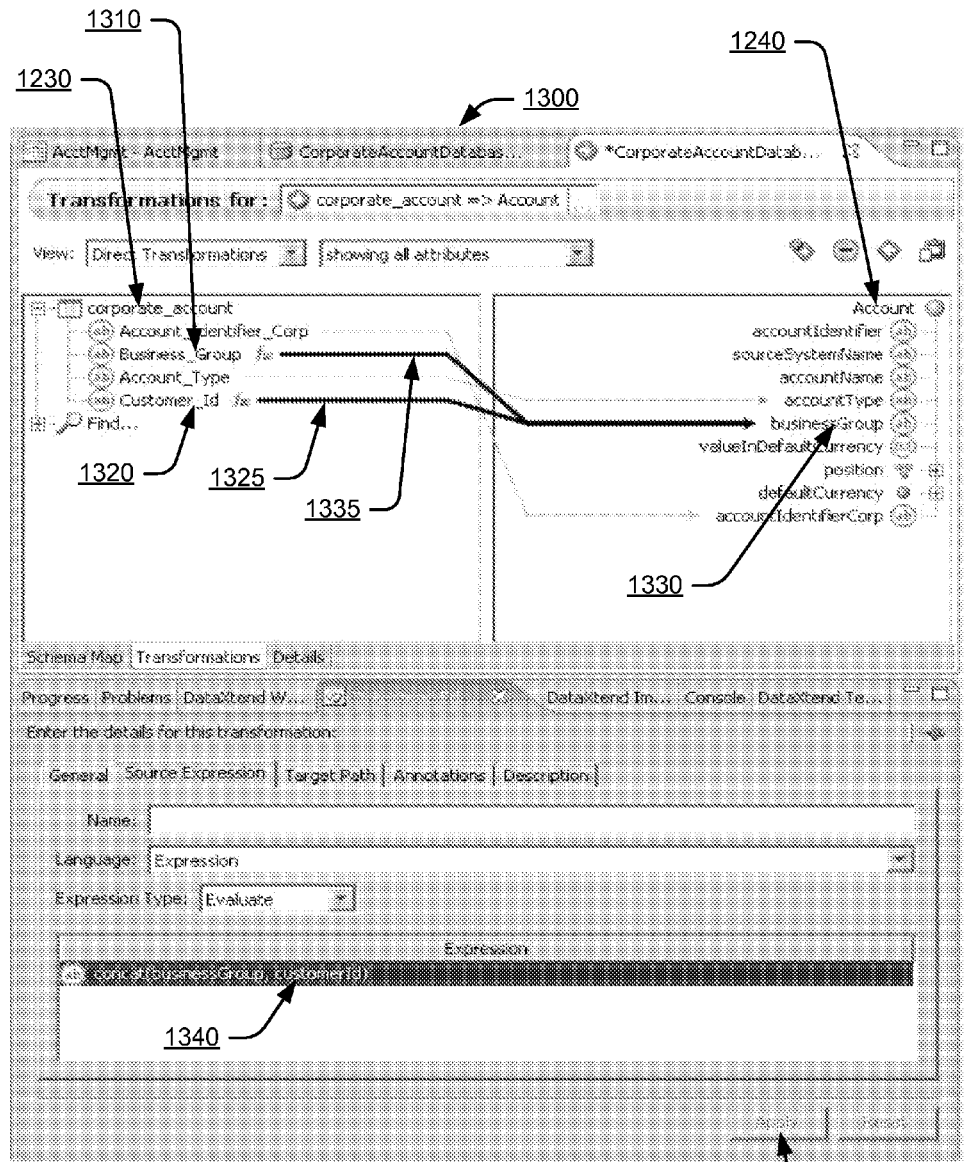
FIG. 13 is a graphical representation of a third embodiment of a user-interface for accessing the query proxy system of the present invention.

The client interface module 420 is adapted to receive a CSM 350, the client-specified mapping metadata 360 and a query from the client 110. In one embodiment, the client interface module 420 is routines or software that control the receipt of information, the generation and presentation of interfaces, and the receipt of input data. For example, the client interface module 420 generates a graphical user interface adapted to receive input from a human user, including dialog boxes and/or drop-down menus in which a human user of the client 110 specifies the CSM 350, the mapping metadata 360 and the query. Example user interfaces are shown in FIGS. 11-13 and described below. While the client interface module 420 is shown as being a separate module of the query proxy system 190 in FIGS. 3 and 4 from the CSM 350, those skilled the art will recognize that in another embodiment, the client interface module 420 includes the CSM 350.

The translator module 440 receives a query or query expression for a CSM 350 from the client interface module 420 and generates a plurality of query expressions, each query expressions being compatible with the object models of a respective source system 150, 160 and 170. The translator module 440 is described in more detail below with reference to FIG. 5.

The runtime module 450 is adapted to execute a runtime command and cooperate with the translator module 440 to transform the query received from the client 110 into a plurality of queries each adapted to be compatible with the object model for a respective one of the plurality of source systems 150, 160 and 170. The runtime module 450 is further adapted to receive the results of executing the plurality of queries against the source systems 150, 160 and 170 and the results expressed as instances of the CSM 350 by executing transformations described in the client-specified mapping metadata 360.

In one embodiment, the query proxy system 190 further comprises a storage device 460 (comprising, e.g., a buffer, RAM, or any other tangible computer-readable medium), a model library 470 for storing one or more CSMs 350, a driver library 480 (comprising, e.g., ODBC drivers, JDBC drivers, ODBC-JDBC bridges, JDBC-ODBC bridges, etc.), and an API library 490 (comprising, e.g., ODBC APIs, JDBC APIs, etc.) and/or an interface device 494.

Figure 5:
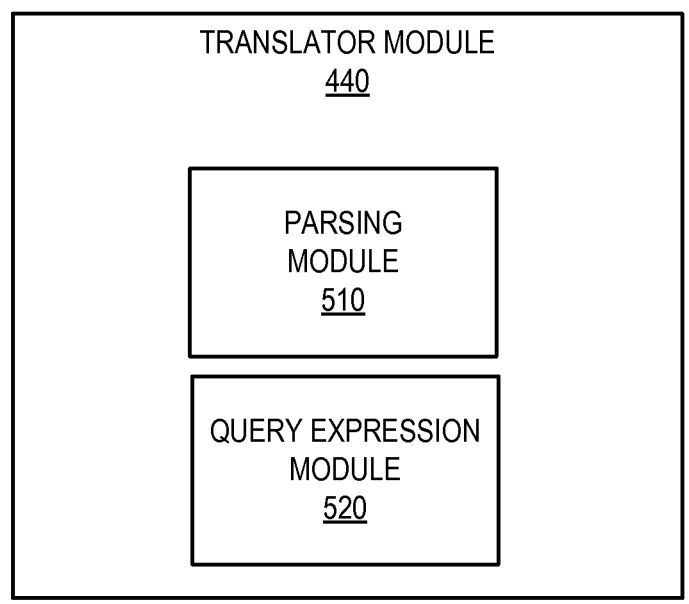
FIG. 5 is a block diagram of an embodiment of a translator module.

Referring now to FIG. 5, one embodiment of the translator module 440 is described. The translator module 440 comprises a parsing module 510 and a query expression module 520. The parsing module 510 comprises a parser or regular expression algorithm adapted for communication to receive and parse the query expression received from the client 110, in particular the client interface module 420. The query expression module 520 receives the mapping metadata 240 and the object model metadata 250 from the source system 150, 160 or 170, the CSM 350 and the client-specified metadata 360 from the client 110 and a parsed query from the parsing module 510; and from these inputs generates a plurality of query expressions each compatible with a respective object model for the plurality of source systems 150, 160 and 170.

Figure 6:
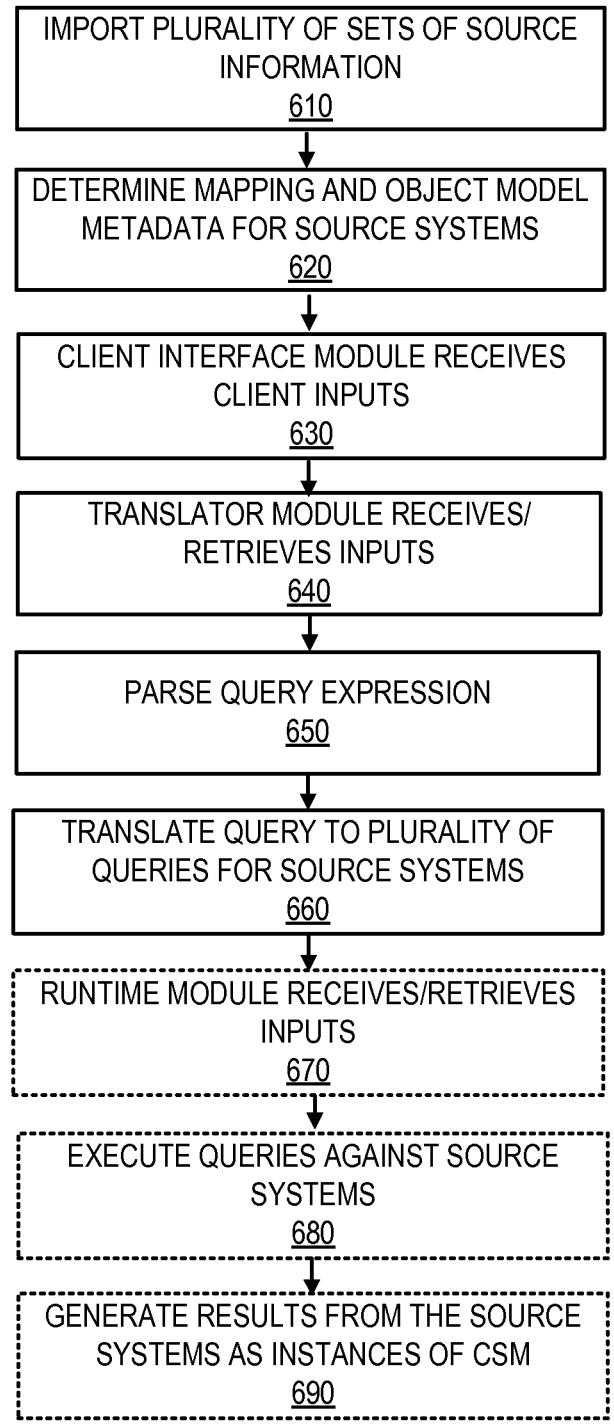
FIG. 6 is a flow chart of an embodiment of a method for receiving a query expression for a client-specified model and generating results from a plurality of source systems.

Turning now to FIG. 6, depicted is a flow chart of one embodiment of a method for translating a query received from the client 110 into a plurality of queries compatible with the object model(s) for the plurality of source systems 150, 160 and 170, executing the plurality of queries against the source systems 150, 160 and 170, and receiving results from the X sets of response data 285 stored across the plurality of source systems 150, 160 and 170.

The import module 410 imports 610 the plurality of sets of source information 230 (including the sets of mapping metadata 240 and sets of object model metadata 250) from the source systems 150, 160 and 170. In one embodiment, the import module 410 then determines 620 the plurality of sets of mapping metadata 240 and the plurality of sets of object model metadata 250 that correspond to the respective source systems 150, 160 and 170. Next, the client interface module 420 receives 630 the CSM 350, the client-specified mapping metadata 360 and a query from the client 110.

The translator module 440 receives 640 the object model metadata 250 and the mapping metadata 240 from the import module 410. The translator module 440 also receives 640 the CSM 350, the client-specified mapping metadata 360 and the query from the client interface module 420. Alternatively, in some embodiments, the import module 410 stores the object model metadata 250 and the mapping metadata 240 on a storage medium 390. In these embodiments, the translator module 440 retrieves 640 the object model metadata 250 and the mapping metadata 240 from the storage medium 390 instead of receiving the object model metadata 250 and the mapping metadata 240 from the import module 410.

The translator module 440 parses 650 the query expression and translates 660 the parsed query expression into a plurality of query expressions, each compatible with respective object models for the plurality of source systems 150, 160 and 170 based on the CSM 350, the client-specified mapping metadata 360, the object model metadata 250, the mapping metadata 240 and the parsed query. The translating step 660 will be described in more detail below with reference to FIG. 7.

For example, assume that the source systems 150, 160 and 170 each have different object models, object model A, object model B and object model C, respectively, and that the import module 410 has imported 610 source information 230 (including the sets of mapping metadata 240 and sets of object model metadata 250) from each of the source systems 150, 160 and 170 and determined which mapping metadata and object model metadata correspond to each of the source systems 150, 160 and 170. Next, the client interface module 420 receives 630 the CSM 350, the client-specified mapping metadata 360 and a query expression from the client 110. The translator module 440 receives 640 the object model metadata 250 and the mapping metadata 240 from the import module 410. The translator module 440 also receives 640 the CSM 350, the client-specified mapping metadata 360 and the query expression from the client interface module 420. The translator module 440 then parses 650 the query expression and translates 660 the parsed query expression into three query expressions, each compatible with a respective one of object model A, object model B and object model C. These translations 660 are based on the CSM 350, the client-specified mapping metadata 360, the object model metadata 250 for a particular object model A, object model B or object model C for a respective source system 150, 160 and 170 and the parsed query. Still more particularly, one query expression compatible with object model A is generated by the translator module 440 based on the object model metadata 250 for object model A, as well as the CSM 350, the client-specified mapping metadata 360 related to the source system 150 and the parsed query. The query expressions for source systems 160 and 170 are generated using similar inputs, but particular to their object model B or C and their source system 160 and 170.

The runtime module 450 receives 670 the client-specified mapping metadata 360, the plurality of query expressions compatible with the object models for the plurality of source systems 150, 160 and 170, and the mapping metadata 240 from the translator module 440. The runtime module 450 then executes 680 the plurality of query expressions against the respective source systems 150, 160 and 170 and generates 690 results from the source systems 150, 160 and 170. Using the client-specified mapping metadata 360, these results are transformed into instances of the CSM 350. The instances of the CSM 350 can then be used by client side resources (not shown) to further process the results as desired.

Thus, based on the foregoing it will be understood to persons having ordinary skill in the art that the CSM 350 beneficially enables bidirectional transformation of communications between the client 110 and the source systems 150, 160 and 170 by providing transformation of a query received from the client 110 to a plurality of query expressions compatible with the object model(s) of a plurality of source systems 150, 160 and 170 and transformation of X results from the source systems 150, 160 and 170 to the client 110 as instances of the CSM 350.

In some embodiments, the translator module 440 stores the client-specified mapping metadata 360, the plurality of queries compatible with the object models for the plurality of source systems 150, 160 and 170, and the mapping metadata 240 on a storage medium (e.g., storage medium 390). In these embodiments, the runtime module 450 retrieves these inputs from the storage medium 670 and then proceeds as described above to perform steps 680 and 690.

Figure 7:
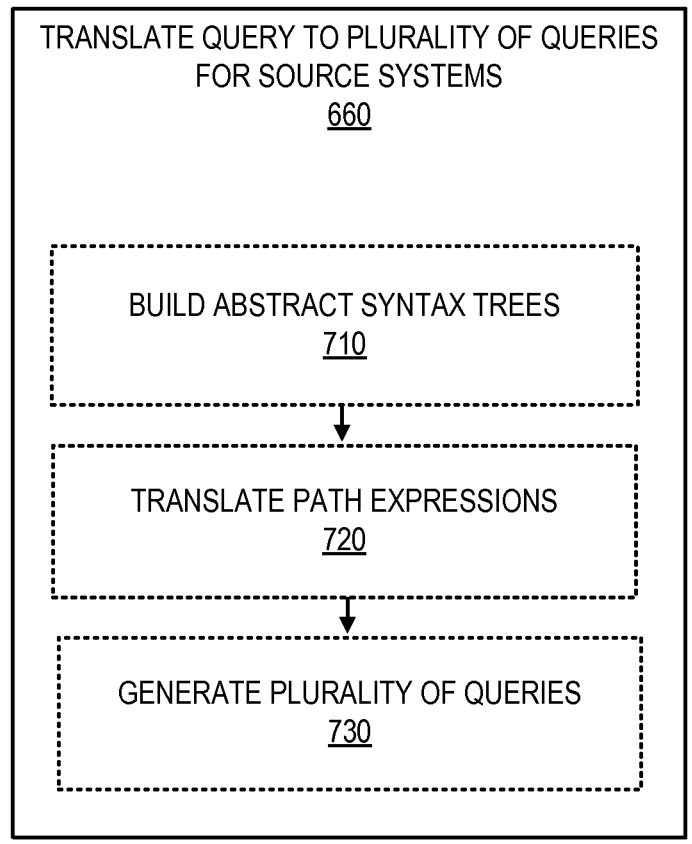
FIG. 7 is a flow chart of an embodiment of a method for translating a query expression for a client-specified model to a plurality of query expressions for a plurality of source systems based on one or more abstract syntax trees.

Turning now to FIG. 7, depicted is a flow chart of one embodiment of a method for translating 660 the parsed query into a plurality of queries compatible with the object models for the plurality of source systems 150, 160 and 170. The translator module 440 begins by building 710 a plurality of abstract syntax trees based on the parsed query and the plurality of sets of mapping metadata 240.

An abstract syntax tree is a representation of the syntax of some source code (that has been written in a programming language). Each node of the tree denotes a construct occurring in the source code. The tree is abstract in the sense that it may not represent some constructs that appear in the original source. For example, grouping parentheses are generally omitted since in an abstract syntax tree the grouping of operands is implicit in the tree structure. In one embodiment, a parser such as that used to compile source code is used to build the abstract syntax tree.

The translator module 440 then translates 720 path expressions against the plurality of abstract syntax trees generated in step 710 and generates 730 a plurality of queries compatible with the object models for the plurality of source systems 150, 160 and 170 based on the abstract syntax trees.

Figure 8:
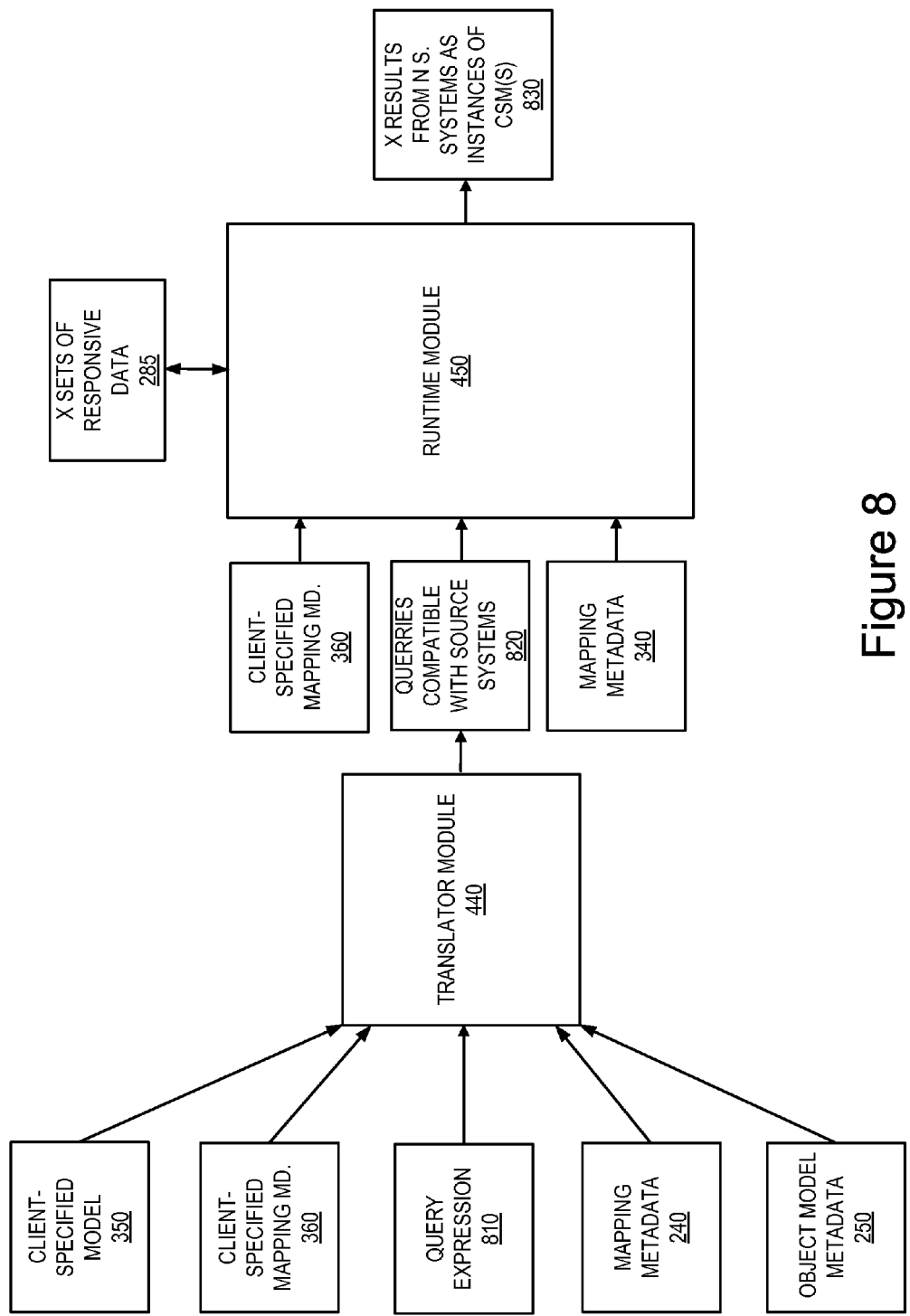
FIG. 8 is a flow diagram of a second embodiment of a process for translating a query expression and generating results from the source systems.

Turning now to FIG. 8, depicted is a flow diagram of one embodiment of a process for translating a query for a client-specified model 350 received from the client 110 into a plurality of queries compatible with respective object models for the plurality of source systems 150, 160 and 170, executing the plurality of queries against the source systems 150, 160 and 170, and receiving results from the X sets of response data 285 stored across the source systems 150, 160 and 170. The translator module 440 receives the CSM 350, the client-specified mapping metadata 360, and the query expression 810 from the client interface module 420. The translator module 440 also receives the object model metadata 250 and the mapping metadata 240 from the import module 510. The translator module 440 parses the query expression 810 and translates the parsed query into a plurality of queries compatible with the object models for the plurality of source systems 150, 160 and 170 as described above with reference to FIGS. 6 and 7.

The runtime module 450 can receive the client-specified mapping metadata 360, the plurality of queries compatible with the object models for the plurality of source systems 150, 160 and 170, and the mapping metadata 240 from the translator module 540. The runtime module 450 then executes the plurality of queries 820 against the plurality of source systems 150, 160 and 170, thereby generating results 830 from the X sets of response data 285 stored across the source systems 150, 160 and 170. When received by the runtime module 450, the results are then transformed into instances of the CSM 350 by executing the client-specified metadata 360.

Figure 9:
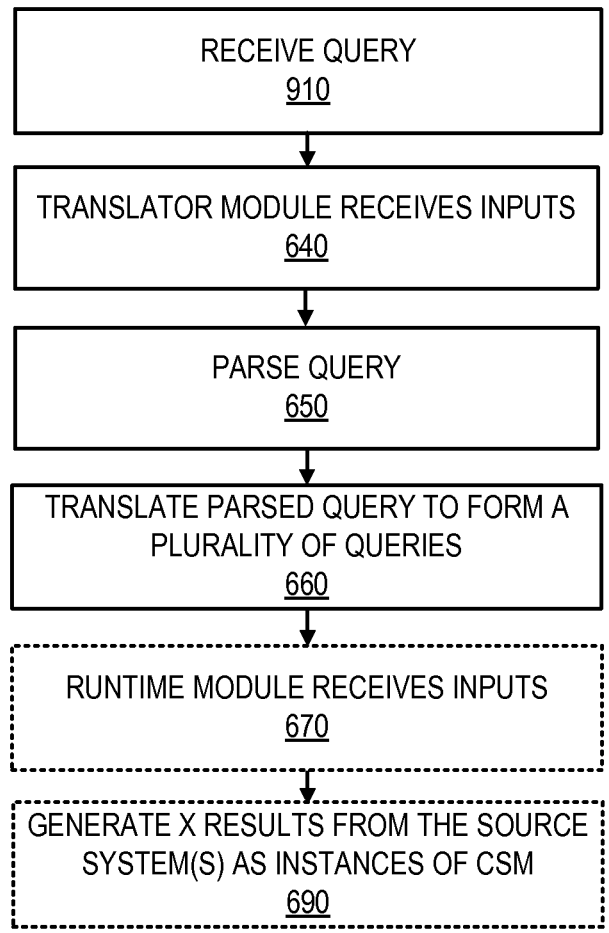
FIG. 9 is a flow chart of a third embodiment of a method for translating a query expression for the plurality of source systems based stored inputs and generating results from the plurality of source systems.

Turning now to FIG. 9, depicted is a flow chart of one embodiment of an alternative method for translating a query received from the client 110 into a plurality of queries compatible with the object model(s) for the plurality of source systems 150, 160 and 170, executing the plurality of queries against the source systems 150, 160 and 170, and receiving results from the X sets of response data 285 stored across the plurality of source systems 150, 160 and 170. In this embodiment, the translator module 440 has processed the CSM 350 and the metadata 240, 250 and 360 at an earlier time and stored these inputs on a tangible storage medium (e.g., the computer-readable medium 390 and/or the storage devices 560).

The translator module 440 receives 910 a query from the client interface module 420. The translator module 440 parses 650 the query and translates 660 a plurality of queries for the plurality of source systems 150, 160 and 170 based on the stored inputs 350, 360, 250 and 240 and the parsed query. The runtime module 450 then performs the same processes described above for steps 670-690 to generate results from the X sets of response data 285 stored across the plurality of source systems 150, 160 and 170. When received by the runtime module 450, the results are transformed into instances of the CSM 350 by executing the client-specified metadata 360.

Figure 10:
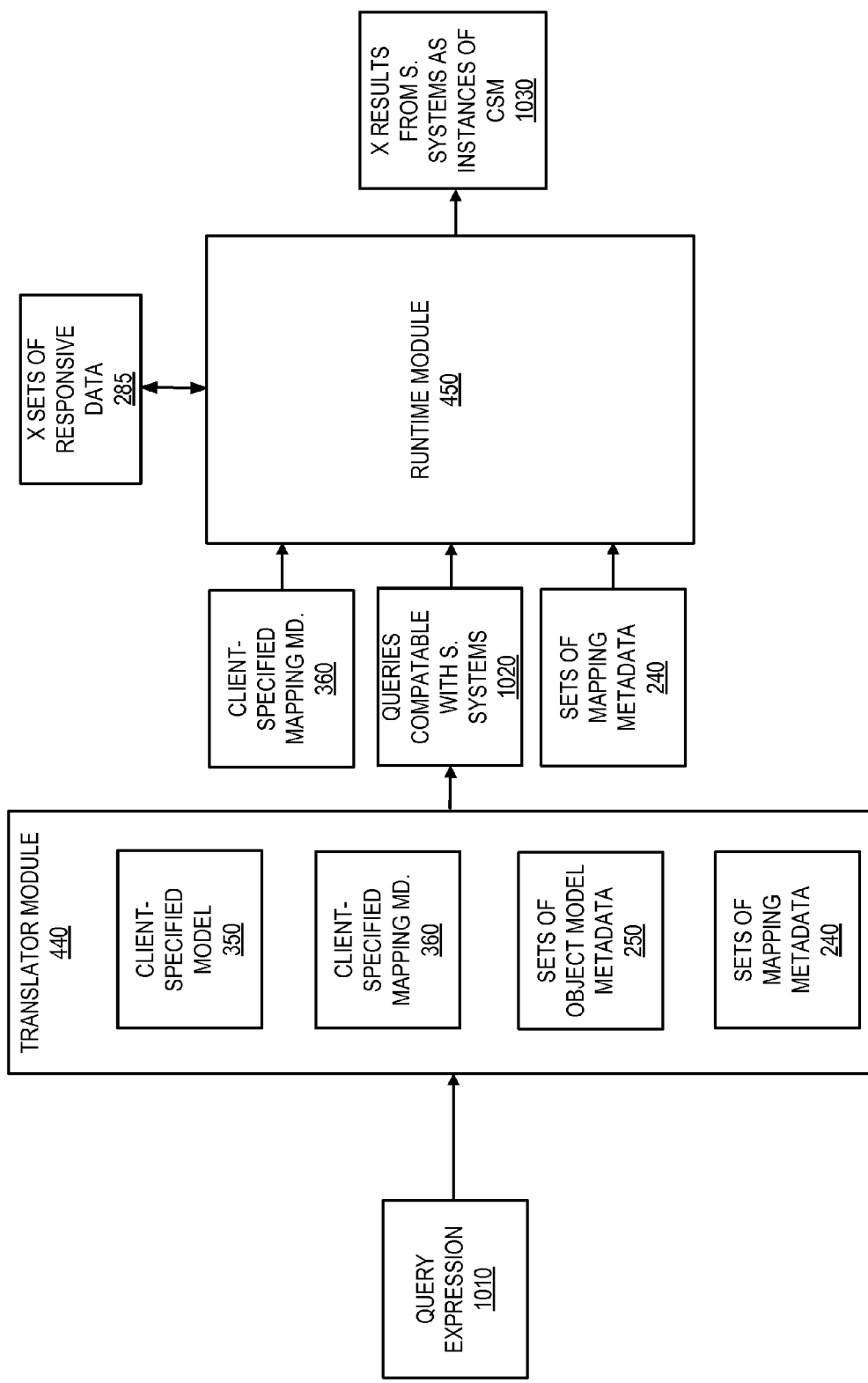
FIG. 10 is a flow diagram of a fourth embodiment of a process for translating a query expression based on stored inputs and generating results from the plurality of source systems.

Turning now to FIG. 10, depicted is a flow diagram of one embodiment of a process for translating a query received from the client 110 into a plurality of queries compatible with the object model(s) for the plurality of source systems 150, 160 and 170, executing the plurality of queries against the source systems 150, 160 and 170, and receiving results from the X sets of response data 285 stored across the source systems 150, 160 and 170. Similar to FIG. 9 above, this embodiment assumes that the translator module 440 has processed the inputs 350, 360, 250 and 240 at an earlier time and stored these inputs 350, 360, 250 and 240 on a tangible storage medium (e.g., the computer-readable medium 390 and/or the storage devices 560).

The translator module 540 receives a query expression 1010 from the client interface module 440. The translator module 440 performs steps 650-660 as described above for FIG. 6 to translate the query expression 1010 into a plurality of queries 1020 compatible with the object model(s) for the plurality of source systems 150, 160 and 170 based on the stored inputs 350, 360, 250 and 240 and the parsed query expression 1010. The runtime module 450 can perform steps 670-690 as described above for FIG. 6 to generate results from the X sets of response data 285 stored across the plurality of source systems 150, 160 and 170. When received by the runtime module 450, the X results 285 are transformed into instances of the CSM 350 by executing the client-specified metadata 360.

In some embodiments any combination of the steps and/or processes described above for FIGS. 6-10 can be performed contemporaneously and/or automatically by the query proxy system 190.

Example User Interfaces

Turning now to FIG. 11, depicted is a screen shot of a first embodiment of a user-interface for accessing the query proxy system 190. A user identifies and selects a CSM 350 and one or more data sources 150, 160 and 170 using this interface. A window 1100 comprises a user-interface window adapted to receive input from a human user of the client 110. A first graphical image 1110 comprises a graphical representation of a CSM 350. A second graphical image 1120 comprises a graphical representation of a source system named "AccountDatabase," a third graphical image 1130 comprises a graphical representation of a second source system named "CorporateAccount Database" and a fourth graphical image 1140 comprises a graphical representation of a third source system named "StockQuoteDataSource." Similar to source system 150, 160 and 170, the source systems represented by graphical images 1120, 1130 and 1140 each comprise one or more database(s), the database(s) comprising a plurality of sets of source information 230 (including a set of mapping metadata 240 and a set of object model metadata 250) and X sets of response data 285.

As described in more detail with reference to FIGS. 12 and 13, the source systems 150, 160 and 170 represented by graphical images 1120, 1130 and 1140 can be mapped to the CSM 650 represented by graphical image 1110.

Turning now to FIG. 12, depicted is a screen shot of a second embodiment of a user-interface for accessing the query proxy system 190. This user interface presents the mappings between the source system data and the CSM 650. A window 1200 comprises a user-interface window adapted to receive input from a human user of the client 110. A graphical image 1130 comprises a graphical representation of the second source system "CorporateAccountDatabase." A graphical image 1220 comprises a graphical representation of a table of client-specified mapping metadata 360 for the "CorporateAccountDatabase" source system represented by graphical image 1130. A graphical image 1230 comprises a graphical representation of a table named "corporate account." A graphical image 1240 comprises a graphical representation of an object of CSM 650 named "Account."

As described in more detail with reference to FIG. 13, a human user of the client 110 maps the table "corporate_account" represented by graphical image 1230 to the CSM "Account" represented by graphical image 1240. Once mapped, the client 110 executes queries against the source system "CorporateAccountDatabase" represented by graphical image 1130 and receives results from the source system "CorporateAccountDatabase" represented by graphical image 1130. When received, the results are transformed to instances of the CSM object "Account" represented by graphical image 1240.

Turning now to FIG. 13, depicted is a screen shot of a third embodiment of a user-interface for accessing the query proxy system 190. In particular, this interface is used by the user to create mappings between the object model of the source systems and the CSM 350. A window 1300 comprises a user-interface window adapted to receive input from a human user of the client 110. A graphical image 1340 comprises a graphical representation of a user input box configured to receive input from a keyboard or other input device operated by a human user of the client 110. A graphical image 1350 comprises a graphical representation of a button adapted to receive input from a mouse (or keyboard) operated by a human user of the client 110. Graphical images 1340 and 1350 will be described in more detail below.

As described above for FIG. 12, graphical image 1230 comprises a graphical representation of a table named "corporate_account" and graphical image 1240 comprises a graphical representation of the CSM 650 object named "Account." The "corporate_account" table represented by graphical image 1230 comprises a plurality of columns. For example, a graphical image 1310 comprises a graphical representation of a column named "Business_Group" and a graphical image 1320 comprises a graphical representation of a column named "Customer Id." A graphical image 1330 comprises a graphical representation of an aspect of the CSM "Account" named "businessGroup" represented by graphical image 1240.

As further described above with reference to FIG. 12, the "coporate account" table represented by graphical image 1230 is associated with the "CorporateAccountDatabase" source system represented by graphical image 1130. The "CorporateAccountDatabase" source system represented by graphical image 1130 is mapped to the CSM "Account" represented by graphical image 1240 by mapping the columns represented by graphical images 1310 and 1320 to the "businessGroup" CSM aspect represented by graphical image 1330. For example, a human user of the client 110 inputs the expression "concat(businessGroup_customerId)" in the user-interface window represented by graphical image 1340 using a keyboard and then clicks the button represented by graphical image 1350 using a mouse. This expression is represented graphically as depicted by the two lines 1325 and 1335 indicating that both "Customer_Id" and "Business_Group" columns on "corporate_account" are related to the attribute "businessGroup" of the target class "Account". The table "corporate_account" represented by graphical image 1230 is now mapped to the to the CSM "Account" represented by graphical image 1240. Thus, a human user of the client 110 can specify how data is mapped between the client 110 and the source system "CorporateAccountDatabase" represented by graphical image 1130. Once mapped, the client 110 uses this mapping metadata to translate queries for "Account" into queries for "corporate_account" and these translated queries are executed against the source system "CorporateAccountDatabase" represented by graphical image 1130 and then the client 110 receives results from the source system "CorporateAccountDatabase" represented by graphical image 1130.

When received, the results are transformed to instances of the CSM "Account" represented by graphical image 1240.

CONCLUSION

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A query proxy system for translating a query for a client-specified model (CSM) into a plurality of query expressions compatible with object models for source systems, the system comprising:
    a non-transitory computer-readable medium storing computer-executable code, the computer-readable medium comprising:
        an import module adapted to import source information for a plurality of source systems and to determine mapping metadata and object model metadata corresponding to respective source systems, the import module adapted for communication to receive the source information;
        an interface module for generating an interface for receiving the client-specified model, client-specified mapping metadata and the query from a client, the interface module adapted for communication to receive the client-specified model, the client-specified mapping metadata and the query; and
        a translator module adapted to translate the query to the plurality of query expressions based on (1) the client-specified mode received from the client, (2) the client-specified mapping metadata received front the client, (3) the object model metadata corresponding to the respective source systems and (4) the mapping metadata corresponding to the respective source systems, each query expression of the plurality of query expressions compatible with a respective one of the plurality of source systems, the translator module adapted for communication with the import module and the interface module.

2. The query proxy system of claim 1, wherein the translator module is further adapted to parse the query for the CSM.

3. The query proxy system of claim 1, wherein the CSM comprises an object model selected from a group of: a customized object model unique to a specific enterprising environment; an object model imported from UML; and an object model based on the OAGIS specification.

4. The query proxy system of claim 1, wherein the source information comprises an object model selected from a group of a relational model, an object model, an object-relational model, a hierarchical model and a network model.

5. The query proxy system of claim 1, wherein the source information comprises heterogeneous data stored across a plurality of databases.

6. The query proxy system of claim 1, wherein the source systems comprise a plurality of sets of object model metadata and at least one of the sets of object model metadata has a different object model relative to another set of object model metadata.

7. The query proxy system of claim 1, wherein the source systems comprise a plurality of sets of object model metadata and the plurality of sets of object model metadata comprises a combination of object model types selected from a group of: a relational object model; an object-relational object model; a hierarchical object model and a network object model.

8. The query proxy system of claim 1, wherein the query is expressed in a context-free grammar, expressed in Backus-Naur Form or includes at least one complex predicate.

9. The query proxy system of claim 1, further comprising:
    a runtime module adapted to transform results from the plurality of source systems to instances of the CSM based on the client-specified mapping metadata, the plurality of query expressions, the mapping metadata corresponding to the respective source systems and X sets of response data from the plurality of source systems.

10. A method for translating a query for a client-specified model (CSM) to a plurality of query expressions compatible with object models for a plurality of source systems, the method comprising:
    importing source information from a plurality of source systems and determining mapping metadata and object model metadata corresponding to respective source systems;
    receiving the client-specified model, client-specified mapping metadata and the query from a client; and
    translating the query from the client to the plurality of query expressions compatible with object models for the plurality of source systems based on (1) the client-specified model received from the client, (2) the client-specified mapping metadata received from the client, (3) the object model metadata corresponding to the respective source systems and (4) the mapping metadata corresponding to the respective source systems.

11. The method of claim 10, wherein the source information is imported from a plurality of databases of the plurality of source systems.

12. The method of claim 10, wherein the translating includes parsing the query to produce a parsed query and the translating is based on the parsed query.

13. The method of claim 10, wherein the CSM comprises an object model selected from a group of: a customized object model unique to a specific enterprising environment; an object model imported from UML; and an object model based on the OAGIS specification.

14. The method of claim 10, wherein the source information comprises an object model selected from a group of a relational model, an object model, an object-relational model, a hierarchical model and a network model.

15. The method of claim 10, wherein the source information comprises heterogeneous data stored across the plurality of databases.

16. The method of claim 10, wherein the plurality of source systems comprise a plurality of sets of object model metadata and at least one of the sets of object model metadata has a different object model relative to another set of object model metadata.

17. The method of claim 10, wherein the source systems comprise a plurality of sets of object model metadata and the plurality of sets of object model metadata comprises a combination of object model types selected from a group of: a relational object model; an object-relational object model; a hierarchical object model; and a network object model.

18. The method of claim 10, wherein the query is expressed in a syntax-free grammar, expressed in Backus-Naur Form or contains at least one complex predicate.

19. The method of claim 10, further comprising:
generating results from the plurality of source systems expressed as instances of the CSM based on the client-specified mapping metadata, the plurality of query expressions, the mapping metadata corresponding to the respective source systems and X sets of response data from the plurality of source systems.

* * * * *